(12) United States Patent
Reese et al.

(10) Patent No.: US 7,283,253 B2
(45) Date of Patent: Oct. 16, 2007

(54) MULTI-AXIS INTEGRATION SYSTEM AND METHOD

(75) Inventors: Steven A. Reese, Shoreline, WA (US); Carl S. Brown, Seattle, WA (US); Paul C. Goodwin, Shor line, WA (US)

(73) Assignee: Applied Precision, LLC, Issaquah, WA (US)

( * ) Notice: Subject to any disclaimer, the term of this patent is extended or adjusted under 35 U.S.C. 154(b) by 0 days.

(21) Appl. No.: 10/389,269

(22) Filed: Mar. 13, 2003

(65) Prior Publication Data

US 2003/0222197 A1 Dec. 4, 2003

Related U.S. Application Data

(63) Continuation-in-part of application No. 10/215,265, filed on Aug. 6, 2002.

(60) Provisional application No. 60/431,692, filed on Dec. 6, 2002.

(51) Int. Cl.
*G01B 11/24* (2006.01)
(52) U.S. Cl. .................................... 356/601
(58) Field of Classification Search ................ 356/72, 356/601, 608–609; 382/154; 378/62
See application file for complete search history.

(56) References Cited

U.S. PATENT DOCUMENTS

| | | | | |
|---|---|---|---|---|
| 4,383,327 A | * | 5/1983 | Kruger | 378/146 |
| 4,584,704 A | * | 4/1986 | Ferren | 356/3 |
| 4,661,986 A | * | 4/1987 | Adelson | 382/154 |
| 5,231,443 A | * | 7/1993 | Subbarao | 396/93 |
| 5,889,582 A | * | 3/1999 | Wong et al. | 356/608 |
| 6,201,899 B1 | * | 3/2001 | Bergen | 382/154 |
| 6,320,979 B1 | * | 11/2001 | Melen | 382/154 |
| 6,418,243 B1 | * | 7/2002 | Skoglund et al. | 382/154 |
| 6,522,777 B1 | * | 2/2003 | Paulsen et al. | 382/154 |
| 6,549,607 B1 | * | 4/2003 | Webber | 378/21 |

FOREIGN PATENT DOCUMENTS

WO   WO 03/079664   9/2003

OTHER PUBLICATIONS

Agard et al., "Three-dimensional architecutre of a polytene nucleus", 1983, *Nature*, 302: 676-681.
Bracewell, *The Fourier Transform and Its Applications*, 1965, McGraw-Hill Publishing Company, pp. 24-27.

* cited by examiner

*Primary Examiner*—Gregory J. Toatley, Jr.
*Assistant Examiner*—Kara Geisel
(74) *Attorney, Agent, or Firm*—Pillsbury Winthrop Shaw Pittman LLP

(57) ABSTRACT

An image acquisition system and method employing multi-axis integration (MAI) may incorporate both optical axis integration (OAI) and time-delay integration (TDI) techniques. Disclosed MAI systems and methods may integrate image data in the z direction as the data are acquired, projecting the image data prior to deconvolution. Lateral translation of the image plane during the scan in the z direction may allow large areas to be imaged in a single scan sequence.

22 Claims, 14 Drawing Sheets

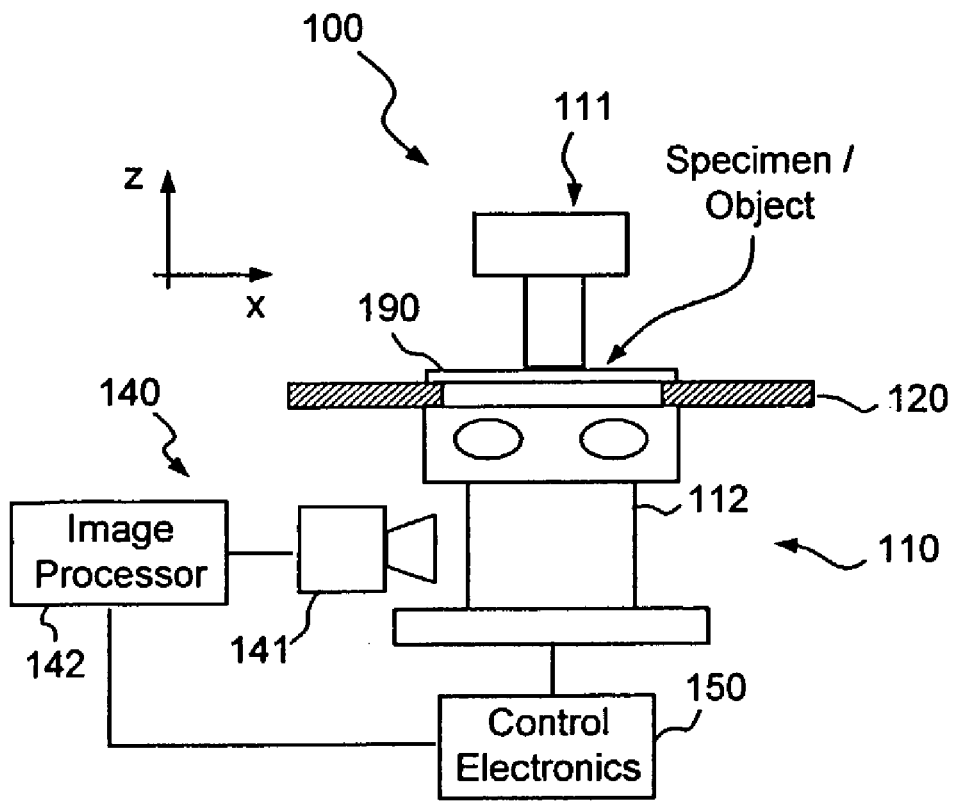
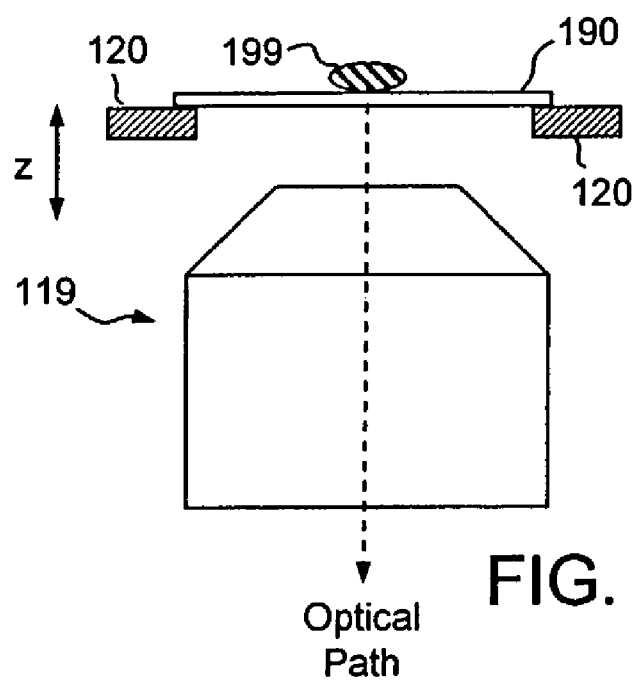

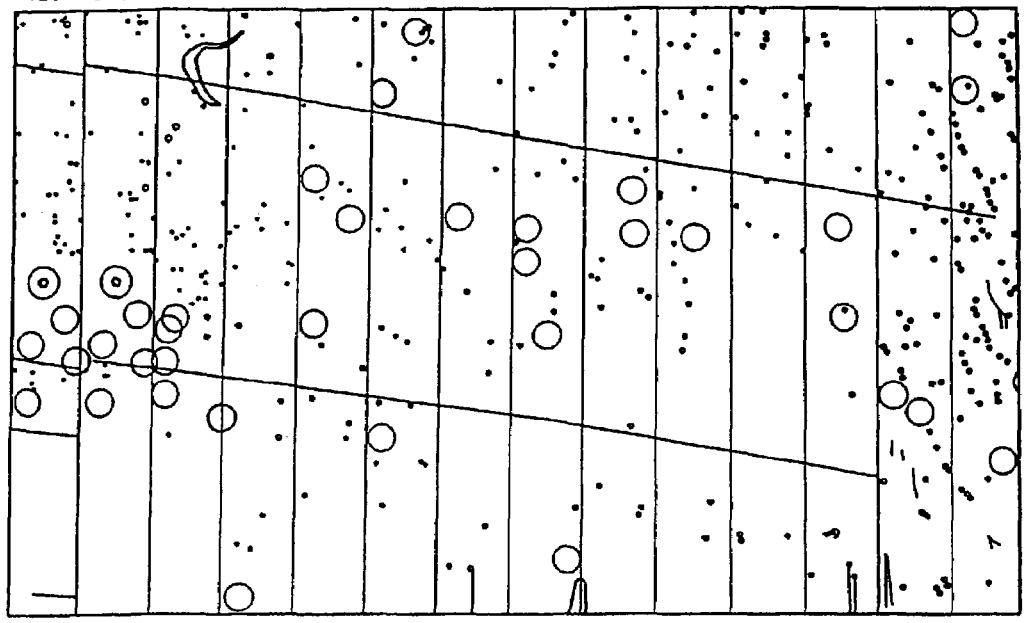
FIG. 8A
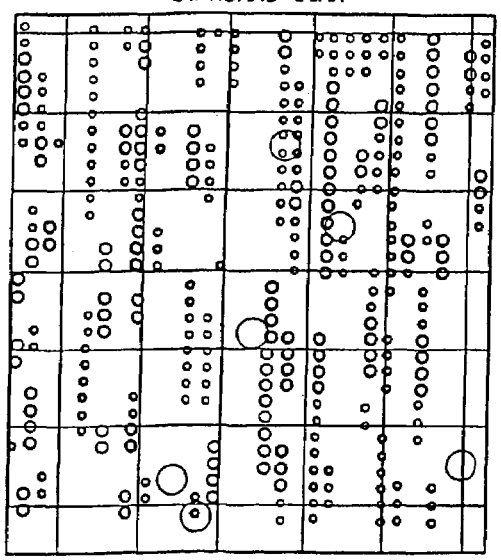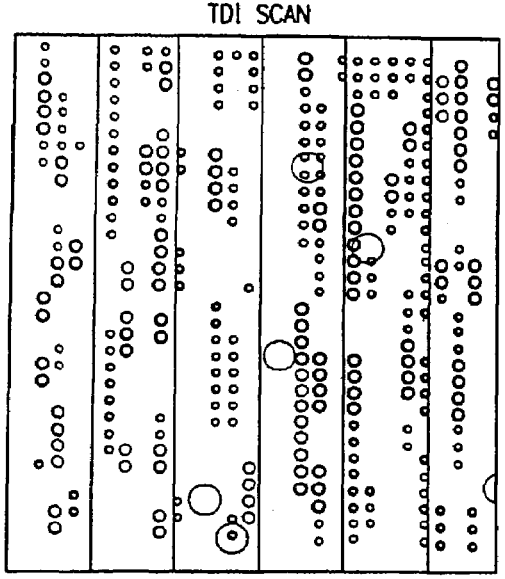
FIG. 8B

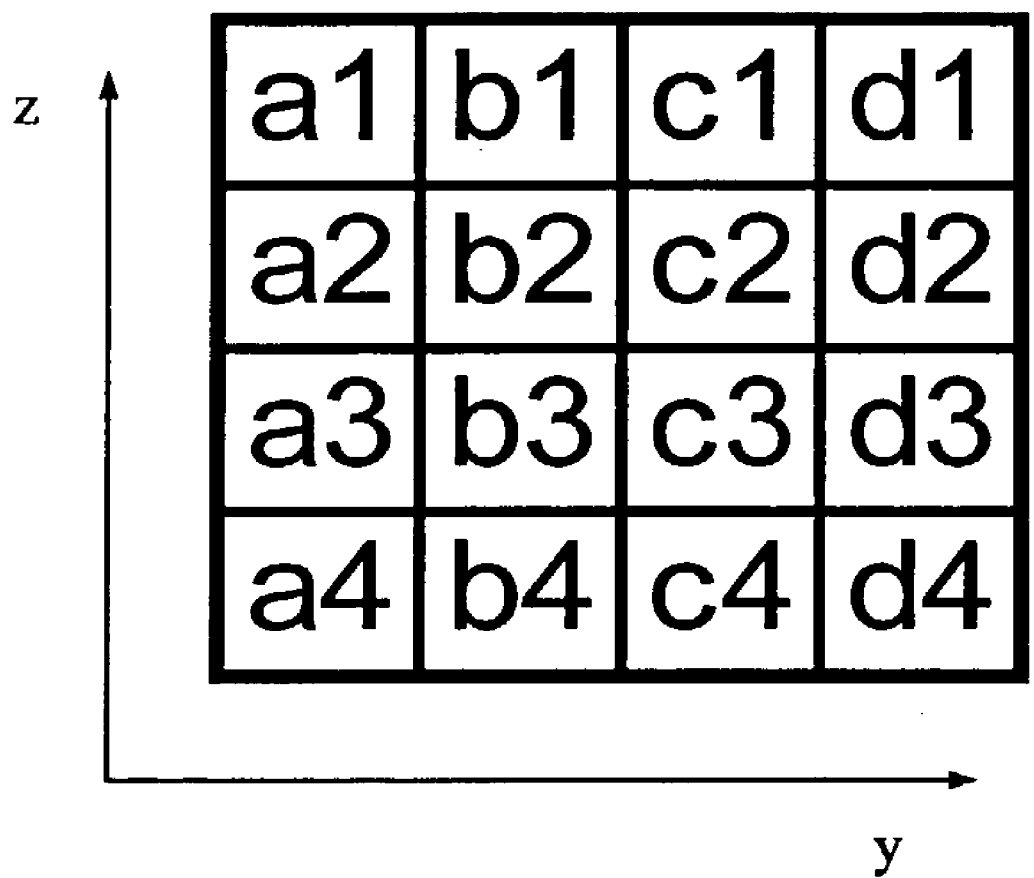
FIG. 11 MAI Digital Scan Object

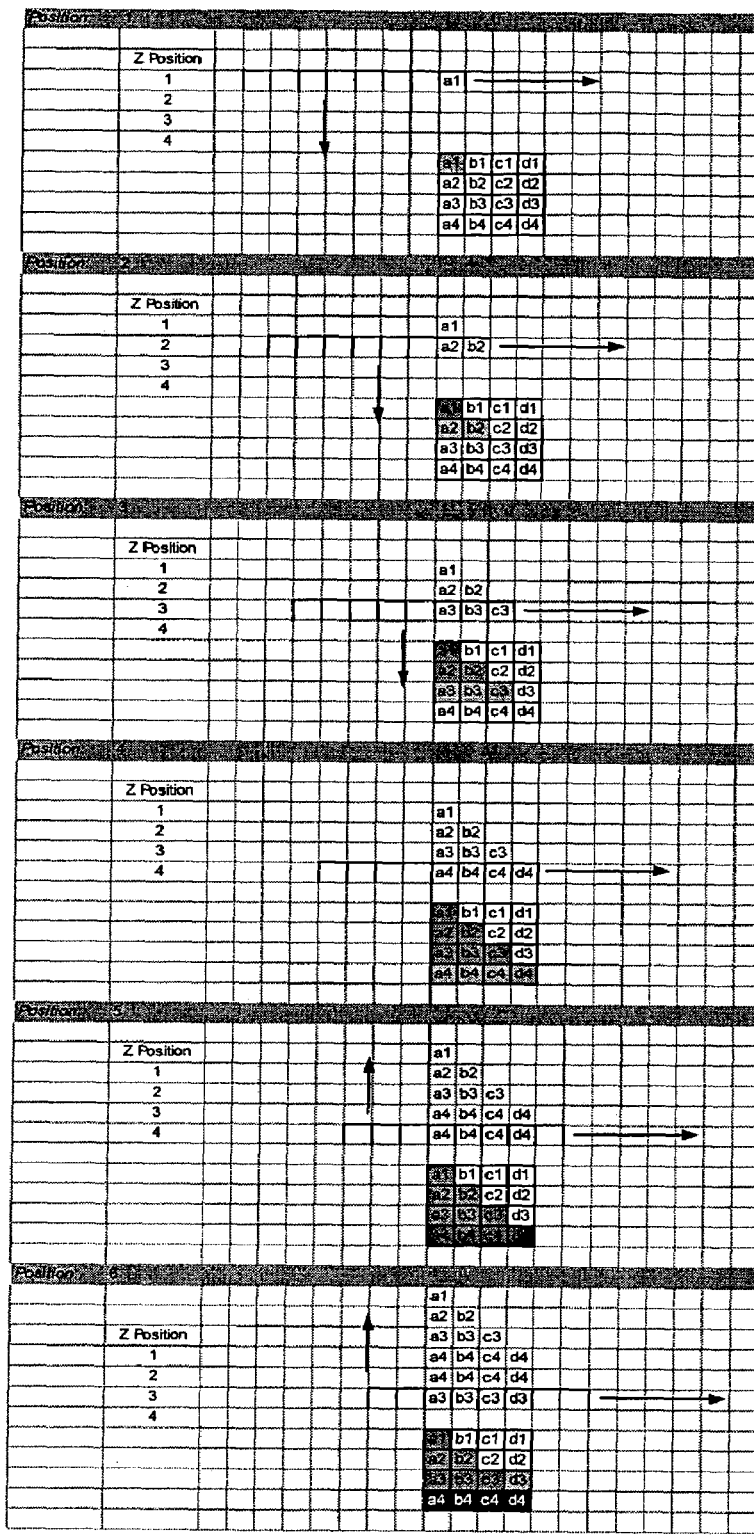
FIG. 12A Digital MAI Scan

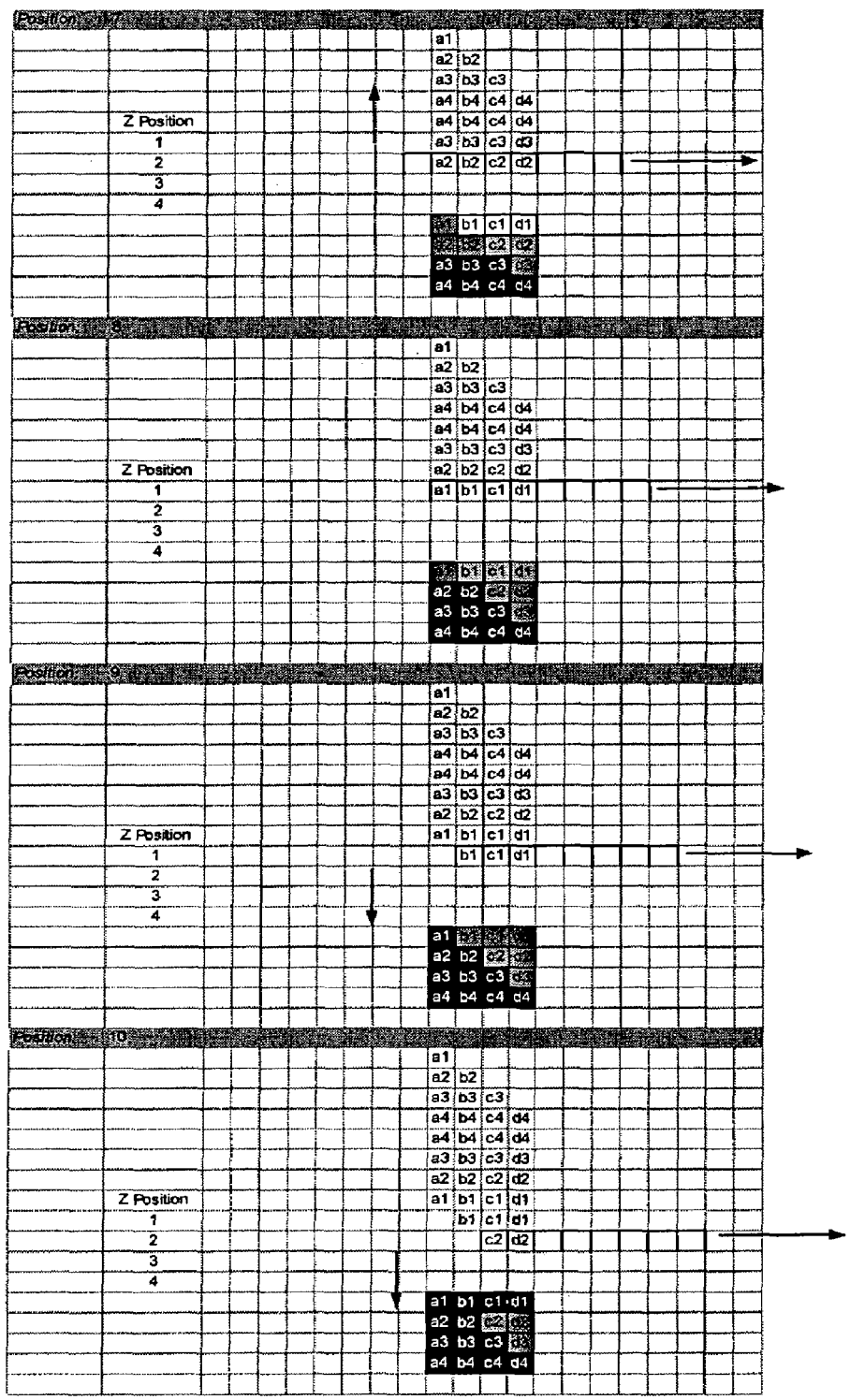
FIG. 12B Digital MAI Scan

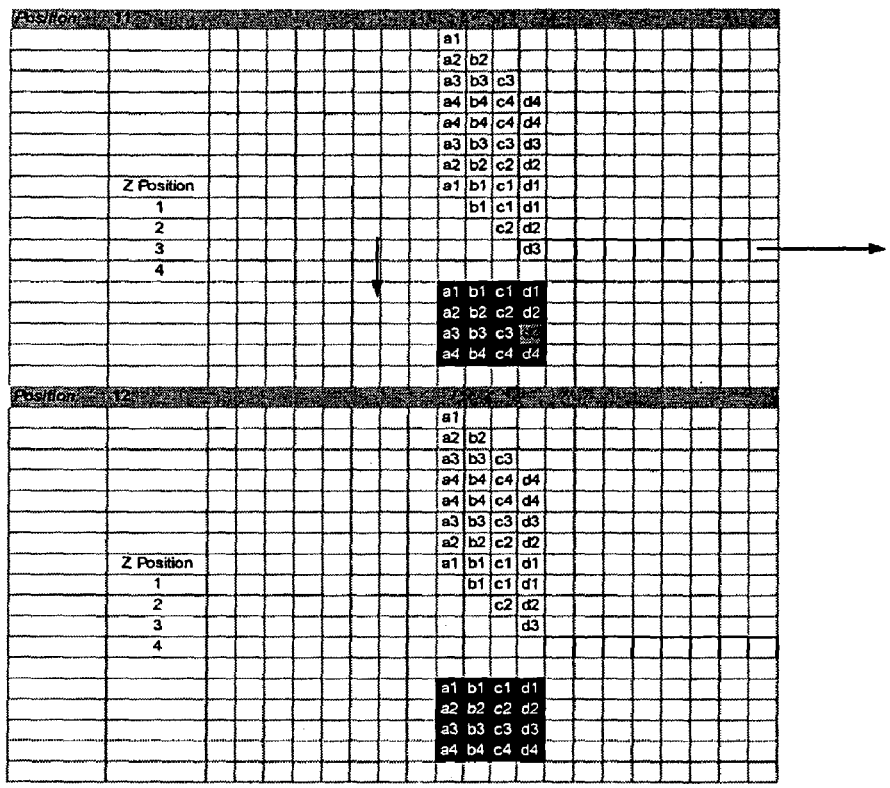
FIG. 12C Digital MAI Scan
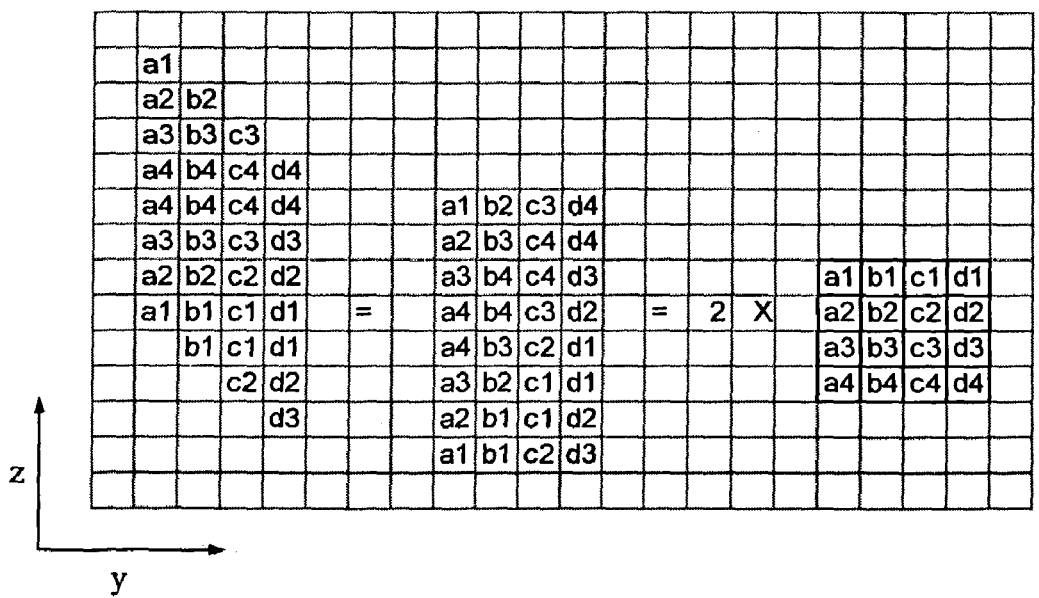
FIG. 13 Digital MAI Summary

MULTI-AXIS INTEGRATION SYSTEM AND METHOD

The present application is a continuation in part and claims the benefit of priority of non-provisional Application No. 10/215,265, filed Aug. 6, 2002, entitled "TIME-DELAY INTEGRATION IMAGING OF BIOLOGICAL SPECIMENS," and also claims the benefit of priority of co-pending U.S. provisional application Ser. No. 60/364,762, filed Mar. 13, 2002, entitled "METHOD FOR MULTI-AXIS INTEGRATION (MAI) IMAGING OF THICK SPECIMENS," and claims the benefit of priority of co-pending U.S. provisional application Ser. No. 60/431,692, filed Dec. 6, 2002, entitled "OPTICAL AXIS INTEGRATION SYSTEM AND METHOD, which three applications are incorporated by reference.

FIELD OF THE INVENTION

Aspects of the present invention relate generally to image acquisition systems and image processing techniques, and more particularly to a system and method of integrating image data obtained along an optical axis and in conjunction with lateral translation of an image plane.

DESCRIPTION OF THE RELATED ART

A variety of autofocus techniques have been developed to enable automated and semi-automated scanning of three-dimensional (3D) objects using short depth-of-field (DOF) optics. Such short DOF optical systems are routinely used in microscopes and other inspection systems, at least partially because a short DOF can provide superior image quality and resolution within the limits of the DOF. By way of background, the resolution of an image is directly proportional to the numerical aperture (NA) of the optics; consequently, high resolution images generally require high NA values. As indicated in Table 1, however, DOF is inversely proportional to the NA; accordingly, a high NA (i.e., high resolution) necessarily generates a narrow DOF which, in turn, increases blurring in the final image since portions of the imaged object extend above and below the plane of focus, or image plane.

In that regard, out-of-focus images are usually not useful for image analysis and are typically a cause of failure in automated scanning and image acquisition systems. Accordingly, autofocus features have typically been regarded as essential components of many conventional, short DOF automated systems.

Autofocus is not a trivial technology, however, and as a consequence, incorporating autofocus functionality presents a variety of complicated challenges associated with design, implementation, integration, and use in conjunction with common imaging systems. In particular, automatically determining a desired or optimal focal plane can be an impossible task when an object to be viewed or imaged is larger in the axial dimension than the DOF of the optics (see Table 1). In such cases, the object to be imaged generally has a plurality of focal planes, none of which may be "correct" or optimal. Even when an autofocus feature is successful in ascertaining a "best" focal plane, the time required to determine that plane of best focus can be a major limitation with respect to the scan rate.

TABLE 1

DOF examples (at 540 nm wavelength) for numerical apertures (NA) from 0.10 to 1.40.

| Type | NA | Refractive Index | DOF (μm) |
| --- | --- | --- | --- |
| Low NA air | 0.10 | 1.00 | 54.00 |
| Med NA air | 0.20 | 1.00 | 13.50 |
| Med NA air | 0.40 | 1.00 | 3.38 |
| Med NA air | 0.45 | 1.00 | 2.67 |
| High NA air | 0.75 | 1.00 | 0.96 |
| High NA water | 1.20 | 1.35 | 0.51 |
| High NA oil | 1.35 | 1.52 | 0.45 |
| High NA oil | 1.40 | 1.52 | 0.42 |

As is generally known in the art, autofocusing methods may be employed in several ways. For example, autofocus techniques are typically used to collect images of two-dimensional (2D) objects mounted or disposed on non-planar surfaces. Further, autofocus is also commonly used to collect images of 3D objects; in fact, most objects of interest with respect to operation of typical image acquisition systems are 3D rather than simply 2D. In some situations, any 2D image of the object may be considered sufficient. In other situations, however, an image captured from a particular, predetermined, or otherwise specified focal plane is desired. In either case, the 2D image obtained with an autofocus technique is ordinarily expected to contain valuable morphological and/or quantitative information about the object, which is usually 3D, as noted above.

Additionally, autofocus may be employed to locate a starting point for a series of images to be obtained along the optical axis (so called "optical sections"); using image data from sequential optical sections, an image processing system may ascertain more information from the resulting 3D image than is possible from analysis of the individual corresponding 2D images. It will be appreciated, however, that each optical section generally contains information from neighboring sections (i.e., sections above and below the focal plane of a given section) due to the DOF range for a given NA, as illustrated in Table 1.

Images obtained from an autofocused system are typically analyzed with algorithms that are based on some form of intensity integration. For example, the pixel intensities within a particular region of interest (e.g., on a microscope slide or a microarray) can be summed or totaled to infer the quantity of a particular chemical within that region; additionally or alternatively, pixels can be counted to determine the total area of the region. At the most basic level, certain existing tests are designed to identify the simple presence or absence of a particular chemical; these tests generally rely upon an intensity integration and are configured to yield a binary result.

In any event, conventional systems generally rely upon the sequential acquisition of a plurality of optical sections followed by a computationally expensive deconvolution operation. In particular, the deconvolution is unnecessarily inefficient, since each particular optical section contains blurred image data from neighboring sections as noted above.

SUMMARY

Embodiments of the present invention overcome the above-mentioned and various other shortcomings of conventional technology, providing an image acquisition system and method employing integration of image data obtained along an optical axis in conjunction with synchronized translation in a lateral direction. A system and method operative in accordance with some embodiments, for example, may integrate (or project) image data in the z direction as the data are acquired; significant savings in computational overhead may be achieved by projecting the image data prior to deconvolution. Lateral translation of the image plane during the scan in the z direction may provide additional efficiency, allowing large areas to be imaged in a single scan sequence.

Generally, an image acquisition system and method employing multi-axis integration (MAI) in accordance with the present disclosure may incorporate both optical axis integration (OAI) and time-delay integration (TDI) techniques.

In accordance with some exemplary embodiments, a method of acquiring data comprises: scanning an object along an optical axis; simultaneously scanning the object along a lateral axis; acquiring image data of the object during the scanning and the simultaneously scanning; and integrating the image data concomitantly with the acquiring. The scanning may comprise providing relative translation along the optical axis of the object and an image plane; similarly, the simultaneously scanning may comprise providing relative translation along the lateral axis of the object and an image plane.

Systems and methods are disclosed wherein the acquiring comprises utilizing a charge-coupled device. In some methods, the integrating comprises utilizing an image processor, and may further comprise deblurring the image data subsequent to the integrating, deconvolving the image data subsequent to the integrating, or both.

In accordance with some exemplary implementations, a method of acquiring data may further comprise calculating a two-dimensional projection of the object from a projection of the image data and a projection of an optical point-spread-function.

The scanning may further comprise selectively alternating a direction of the relative translation along the optical axis. Additionally, the simultaneously scanning may comprise synchronizing the relative translation along the lateral axis with a rate associated with the acquiring.

As set forth in more detail below, a method of acquiring image data of an object may comprise: performing an optical axis integration scan; simultaneously executing a time-delay integration scan sequence; and selectively repeating the performing and the executing.

In some embodiments, the performing comprises acquiring image data of the object at an image plane positioned along an optical axis; the performing may further comprise providing relative translation along the optical axis of the object and the image plane; as noted briefly above, a direction of the relative translation may be selectively alternated.

The executing generally comprises providing relative translation along a lateral axis of the object and the image plane; in some implementations, the executing comprises synchronizing the relative translation along the lateral axis with a data acquisition rate associated with an imaging device.

As set forth above, systems and methods are disclosed wherein: the acquiring comprises utilizing a charge-coupled device; the performing further comprises integrating the image data concomitantly with the acquiring; the integrating comprises utilizing an image processor; or some combination thereof.

Image acquisition systems and methods in accordance with the present disclosure may comprise deblurring the image data subsequent to the integrating, deconvolving the image data subsequent to the integrating, or both. A method may further comprise calculating a two-dimensional projection of the object from a projection of the image data and a projection of an optical point-spread-function.

The foregoing and other aspects of various embodiments of the present invention will be apparent through examination of the following detailed description thereof in conjunction with the accompanying drawings.

BRIEF DESCRIPTION OF THE DRAWINGS

FIG. 1A is a simplified functional block diagram illustrating one embodiment of an image acquisition system operative in accordance with the present disclosure.

FIG. 1B is a simplified functional block diagram illustrating a portion of the image acquisition system depicted in FIG. 1A.

FIGS. 8A and 8B illustrate representations of images acquired using one embodiment of time-delay integration.

FIG. 11 is a simplified side view of an object to be imaged.

FIGS. 12A–12C are simplified side view illustrations of an image plane traversing an object to be imaged using one digital multi-axis integration method.

FIG. 13 is an multi-axis integration summary.

DETAILED DESCRIPTION

Figure 2A:
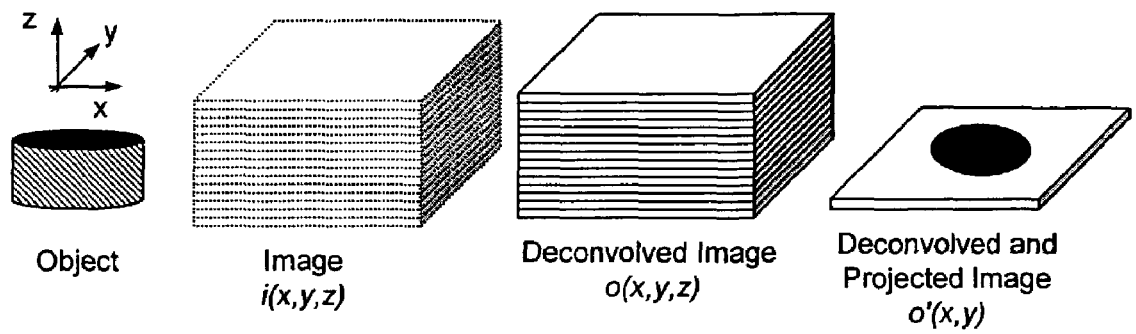
FIGS. 2A–2C are simplified diagrams illustrating the general operation of embodiments of image acquisition and image data processing methods.

As noted briefly above, image acquisition throughput often represents the rate-limiting factor in systems and methods of scanning high-content and high-throughput assays common in biomedical and other applications. Image acquisition throughput can be especially problematic when an assay requires detection of fluorescent probes, for example, and when high lateral resolution (in the x and y dimensions) is required for high-content image analysis algorithms. In cases where the detected signal is weak such as in fluorescence imaging for example, high numerical aperture (NA) lenses are generally used to maximize collection efficiency and to minimize exposure time. A side effect of high NA lenses, however, is that the depth-of-field (DOF, or the dimension of the in-focus region measured in the z direction) is very shallow. As set forth above, high NA lenses have limited ability to view thick objects, and are unable to follow uneven substrates without refocus.

Even in cases where the detected signal is strong or is otherwise easily acquired (such as transmitted visible light, for example) optical systems can still perform inadequately if the sample thickness is greater than can be imaged by the optical DOF; additional imaging difficulties can be introduced if the object to be imaged is not located in a plane orthogonal to the optical axis. These optical limitations often lead to the use of autofocus technology, or the need to acquire images at more than one focal plane.

Although much effort has been invested in autofocus technologies, optical axis integration techniques are more cost effective and generally provide improved performance in many scanning applications. The scanning techniques set forth in detail below are very tolerant of objects having inconsistent or variable focal planes, for example, and may be used to image thick objects. Additionally, scans performed in accordance with the present disclosure may be faster than those implementing autofocus or optical sectioning procedures.

Optical Axis Integration

As an alternative to conventional autofocus methodologies, a system and method operative in accordance with the present disclosure employ optical axis integration (OAI) techniques as set forth in detail below. For a particular object to be imaged, for instance, rather than attempting to determine a particular focal plane for optics or an imaging apparatus (i.e., precisely determining an appropriate or optimal z position of the image plane), the object may be scanned along the optical axis while a detector, computer, or other computational apparatus concomitantly integrates the acquired images or image data. The resulting image is an integral (i.e., projection) of the image of the three-dimensional (3D) object along the optical axis. That is, an OAI image may generally be expressed as follows:

$$i'(x, y) = \int_{-\infty}^{+\infty} i(x, y, z) dz \qquad 1$$

where i' is the two-dimensional (2D) projection of a 3D image, i, along the optical axis (z direction).

In this context, the 3D image, i, can be described mathematically as the object (o) of interest convolved with the point-spread-function (PSF) of a microscope or other optical apparatus, as follows:

$$i(x, y, z) = \qquad 2$$
$$\int_{-\infty}^{+\infty}\int_{-\infty}^{+\infty}\int_{-\infty}^{+\infty} o(x', y', z') psf(x-x', y-y', z-z') dx' dy' dz'$$

Inserting equation 2 into equation 1 gives $$i'(x, y) = \int_{-\infty}^{+\infty}\int_{-\infty}^{+\infty}\int_{-\infty}^{+\infty}\int_{-\infty}^{+\infty} o(x', \qquad 3$$
$$y', z') psf(x-x', y-y', z-z') dx' dy' dz' dz$$

Rearranging the integration along the optical axis, z, then yields $$i'(x, y) = \int_{-\infty}^{+\infty}\int_{-\infty}^{+\infty}\int_{-\infty}^{+\infty} o(x', y', \qquad 4$$
$$z') \int_{-\infty}^{+\infty} psf(x-x', y-y', z-z') dz dx' dy' dz'$$

which is equivalent to $$i'(x, y) = \qquad 5$$
$$\int_{-\infty}^{+\infty}\int_{-\infty}^{+\infty}\int_{-\infty}^{+\infty} o(x', y', z') \int_{-\infty}^{+\infty} psf(x-x', y-y', z) dz dx' dy' dz'$$

Rearranging the integration along z', the OAI image, i'(x,y), may be expressed as:

$$i'(x, y) = \int_{-\infty}^{+\infty}\int_{-\infty}^{+\infty}\int_{-\infty}^{+\infty} o(x', y', \qquad 6$$
$$z') dz' \int_{-\infty}^{+\infty} psf(x-x', y-y', z) dz\, dx' dy'$$

Equation 6 shows that an OAI image, i'(x,y), may be expressed as the convolution of the integral of the object along the optical axis with the integral of the PSF along the optical axis. Equation 6 is also illustrative of the relationship between the projection of the object, the projection of the image, and the projection of the PSF along the optical axis.

The following definitions may facilitate further simplification of the foregoing formulation:

$$o'(x, y) = \int_{-\infty}^{+\infty} o(x, y, z) dz \qquad 7$$

$$psf'(x, y) = \int_{-\infty}^{+\infty} psf(x, y, z) dz$$

Inserting the definitions expressed above into Equation 6 yields $$i'(x, y) = \int_{-\infty}^{+\infty}\int_{-\infty}^{+\infty} o'(x, y) psf'(x-x', y-y') dx' dy' \qquad 8$$

The best method of solving Equation 8 for o'(x,y) involves Fourier Transforms, and is a well known procedure. Applying a Fourier Transform to both sides of Equation 8 and applying the convolution theorem (see, e.g., Bracewell, 1986) results in the following relationship:

$$I'(u,v) = O'(u,v) OTF'(u,v) \qquad 9$$

Capital letters have been used to denote the Fourier Transform of the corresponding functions, and the Fourier Transform of the PSF has been replaced with the conventional term for its Transform, the optical transfer function (OTF). Rearranging terms and performing an inverse Fourier Transform then gives $$o'(x, y) = F^{-1}[I'(u, v)/OTF'(u, v)] \quad 10$$

where $F^{-1}$ represents the inverse Fourier Transform.

Equation 10 describes an efficient method of calculating a 2D projection of an object from a projection of the image and a projection of the optical PSF. A single-step solution may work well with good quality images; for lower quality images, however, an iterative solution of Equation 10 may yield a more reliable result. See, e.g., the constrained iterative technique described by Agard et al. (David A. Agard and John W. Sedat, *Nature*, volume 302, 1984, pages 676 et seq.).

As described and contemplated in the present disclosure, a system and method may implement, incorporate, or comprise OAI techniques in either of two forms: digital; or analog. In embodiments incorporating or practicing digital OAI, for example, a series of images may be collected along the optical axis and then digitally summed to form i'(x,y). This summation may occur during or after the scan, i.e., it may not be necessary to save individual optical sections as discrete images or collections of image data. In analog OAI embodiments, for example, i'(x,y) may be generated by scanning the object along the optical axis while the image data are accumulated within a charge-coupled device (CCD) or other detector. The integration may be performed in the CCD chip and generally may result in only a single image, i.e., a single image may represent the entire depth of the object in the z direction along the optical axis.

Analog OAI may have particular utility with respect to operations involving scanning microarrays, for example, with CCD cameras or other detectors. A system and method employing analog OAI may eliminate or substantially reduce reliance upon sophisticated, time-consuming, and processor intensive autofocus procedures.

In many applications, analog OAI may provide a number of advantages over digital OAI and autofocus, especially for automated scanners. For example, as compared with digital OAI, the analog OAI embodiments: require substantially lower data collection and processor overhead; exhibit lower read noise; and exhibit lower photon noise for equivalent exposure times.

As compared with traditional autofocus systems, advantages of the analog OAI embodiments may include the following: faster scan times; lower total exposure requirements; minimization or elimination of problems related to determining an arbitrary plane of focus; and integration of the 3D object yields or allows full quantitation of the object, i.e., the information content of the OAI image is higher than that achieved with autofocus systems, and accordingly, fewer structures associated with the object of interest are missed.

As compared with the analog technology, advantages of digital OAI embodiments may include a potential for achieving substantially larger photon counts; accordingly, 3D images may be made available for advanced image analysis such as 3D deconvolution, volumetric measurements, and the like.

The synergistic combination of the OAI techniques described above with deconvolution, for example, may provide a significant advance for automated slide scanning techniques. For instance, OAI images generally may benefit from the quantitative deblurring procedure; similarly, deconvolution performance may be improved because Equation 10 deals with images in 2D rather than 3D. Furthermore, many forms of image analyses based upon images obtained from autofocused systems will work equally well (or better) with projected images.

For example, a basic object detection operation may benefit from OAI image processing techniques; in that regard, it will be appreciated that images with minimal DOF (i.e., autofocus images) are less likely to contain a specific object of interest than the corresponding projection image. Likewise, analyses that use intensity integration may also benefit from application of OAI techniques, at least because the z dimension (i.e., along the optical axis) is already integrated into the OAI result. By way of another example, assays that integrate intensities within 3D structures (e.g., nucleus, cytoplasm, and endoplastic reticulum) may generally be more accurate with OAI images because 2D autofocus images cannot properly measure out-of-focus intensities.

Turning now to the drawing figures, FIG. 1A is a simplified functional block diagram illustrating one embodiment of an image acquisition system operative in accordance with the present disclosure, and FIG. 1B is a simplified functional block diagram illustrating a portion of the image acquisition system depicted in FIG. 1A. Those of skill in the art will appreciate that FIGS. 1A and 1B are provided by way of example only, and that the specific arrangement of components is susceptible of numerous modifications; the exemplary scale, orientation, and interrelationship of the various components may be altered in accordance with system requirements. Additionally, as will become apparent from examination of the following description, some or all of the functionality of some components depicted as discrete elements may be combined or incorporated into other components.

System 100 generally comprises a microscope operably coupled to a precision movable stage 120 and to an image acquisition component 140; stage 120 may be configured and operative to support a microarray, microscope slide, or other similar structure (reference numeral 190) upon which a specimen or object 199 to be imaged is disposed. As is generally known in the art, microscope 110 may comprise, or be operative in conjunction with, an illumination source 111 for illuminating stage 120, slide 190, or both with light of a predetermined or selected frequency or spectral bandwidth; in that regard, illumination source 111 may provide light in the visible, infrared, or ultraviolet wavelengths.

In some embodiments, illumination source 111 may be incorporated within housing 112 of microscope 110, i.e., on the opposite side of stage 120 and slide 190 than depicted in FIG. 1A. Alternatively, an additional source of illumination (not shown) to be used in conjunction with, or in lieu of, source 111 may be accommodated or maintained in housing 112. In these embodiments, any such illumination source disposed within housing 112 may be suitably dimensioned and positioned neither to interfere with optical components of microscope 110 nor to obstruct the optical path through microscope 110 (to image acquisition component 140).

As noted above, stage 120 may be movable relative to optics (e.g., objective 119 illustrated in FIG. 1B) incorporated into microscope 110 (microscope optics are not depicted in FIG. 1A). In some embodiments, stage may be movable in both the x and y directions (where the y axis is normal to the plane of FIGS. 1A and 1B). In this context, both the x axis and the y axis may generally be referred to herein as "lateral" axes, and may describe a plane orthogonal to the optical axis (described below) of system 100. Additionally or alternatively, stage 120 may incorporate or comprise one or more structures and mechanisms configured and operative precisely to position slide 190 laterally in the x and y directions relative to the structure of stage 120 itself. In such embodiments, precise 2D lateral positioning (i.e., x and y coordinates) of object 199 relative to the optical path of microscope 110 may be achieved through movement of stage 120 relative to microscope optics, movement of slide 190 relative to stage 120, or both.

In some embodiments, stage 120 may also be movable along the z axis (the optical axis). It will be appreciated that microscope optics may also facilitate positioning an object on slide 190 in the proper location in 3D space (i.e., x, y, and z coordinates) relative to the optical path and the focal point of objective 119. In that regard, one or more optical components of microscope 110 such as objective 119 may be movable in the z direction, either in addition to, or as an alternative to, selectively moving stage 120 along the optical axis. Additionally or alternatively, objective 119 may be movable along the x axis, the y axis, or both.

It will be appreciated that numerous mechanisms and methods of positioning object 199 to be imaged relative to microscope optics are generally known. Relative movement of various components (such as slide 190, stage 120, and objective 119, for example), either individually or in combination, may vary in accordance with system requirements and configuration, and may be effectuated to position object 199 in a suitable location relative to objective 119. The present disclosure is not intended to be limited by the structures and processes employed to position object 199 relative to objective 119 and the optical path or the image plane. Accordingly, reference made herein to relative motion of object 199 and an image plane may generally comprise movement of object 199, movement of the image plane, or some combination of both.

Microscope optics may generally be configured and operative in conjunction with image acquisition component 140; in that regard, component 140 generally comprises a camera, charge-coupled device (CCD), or other detector 141 operably coupled to an image processor 142 or other appropriate electronics. System 100 may additionally include control electronics 150 operative to control, for example: operational parameters, functional characteristics, or other configurable aspects of image processor 142 and detector 141; two- or three-dimensional motion of stage 120, objective 119, or other components; power output, spectral bandwidth, frequencies, or other parameters for source 111 and any other illumination source incorporated into system 100; data storage; and the like. In that regard, electronics 150 may comprise one or more microprocessors, microcontrollers, or other programmable devices capable of executing computer readable instructions; additionally, electronics 150 may also comprise or be operably coupled with data storage media or networked devices such as file servers, application servers, and the like. Those of skill in the art will appreciate that various methods and apparatus employing microprocessors or computer executable instruction sets to configure and to control operation of image acquisition systems are generally known.

In operation, image data acquired by detector 141 may be summed, manipulated, saved, or otherwise processed by hardware, software, or both resident at image processor 142; in some embodiments, functionality of processor 142 may be influenced or controlled by signals transmitted from electronics 150 as noted above. Alternatively, the functionality of image processor 142 and electronics 150 may be incorporated into a single device, for example. Specifically, image processor 142 may be operative in accordance with instruction sets to compute solutions or approximations for the equations set forth herein.

Figure 2B:
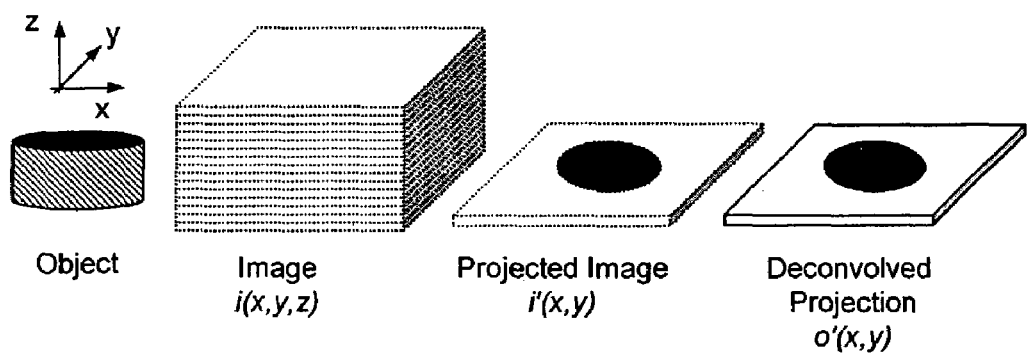
Figure 2C:
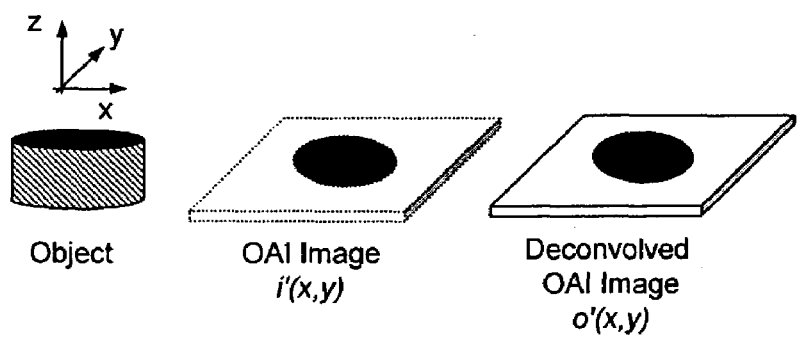
Figure 3A:
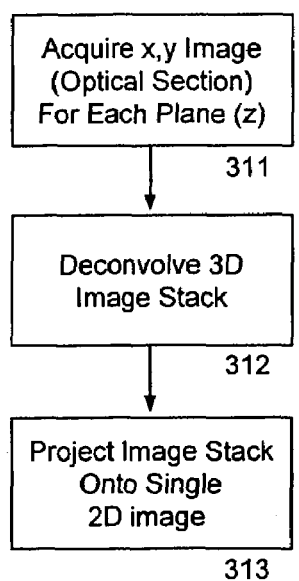
FIGS. 3A–3C are simplified flow diagrams illustrating the general operation of the methods depicted in FIGS. 2A–2C.
Figure 3B:
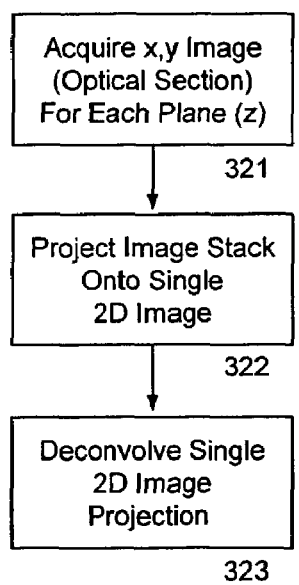
Figure 3C:
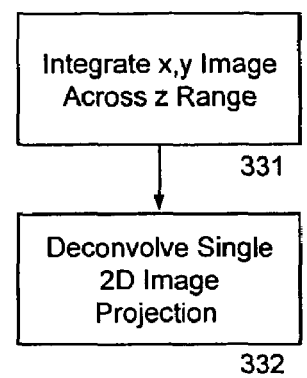

FIGS. 2A–2C are simplified diagrams illustrating the general operation of embodiments of image acquisition and image data processing methods, and FIGS. 3A–3C are simplified flow diagrams illustrating the general operation of the methods depicted in FIGS. 2A–2C.

FIGS. 2A and 3A generally illustrate one conventional approach to image processing operations. As set forth above and indicated at block 311, a series, or stack, of 2D images is acquired in sequential x,y planes (i.e., optical sections) along the z axis. The resulting image, $i(x,y,z)$, is expressed mathematically at Equation 2 above, which is computationally expensive to solve. As illustrated in FIG. 2A, the deconvolution operation depicted at block 312 is executed with respect to the entire stack of optical sections, and is accordingly inefficient and processor-intensive; since each optical section includes data from other sections (due to DOF range, for example), the deconvolution operation processes more data than required. Finally, the deconvolved 3D image is projected into 2D image, $o'(x,y)$, as indicated at block 313.

FIGS. 2B and 3B generally illustrate a significantly improved approach to image processing operations as contemplated herein. As in the FIG. 3A embodiment, a series, or stack, of 2D images may be acquired in sequential x,y planes (i.e., optical sections) along the z axis (block 321). The resulting image, $i(x,y,z)$, is expressed mathematically at Equation 2 above, which is computationally expensive to solve. As illustrated in FIG. 2B and indicated at block 322, the stack of optical sections may be projected into 2D image, $i'(x,y)$, prior to deconvolution; this image is expressed mathematically at Equation 8 above, which is a substantially simplified, 2D version of Equation 2. The deconvolution operation depicted at block 323 results in the same 2D image, $o'(x,y)$, as the embodiment described above with reference to FIGS. 2A and 3A; the FIG. 3B embodiment generates the deconvolved projection at a significant savings in computational overhead, however, since the processor-intensive deconvolution is executed in only two dimensions.

FIGS. 2C and 3C illustrate one embodiment of an image acquisition and processing methodology employing OAI techniques for efficient production of 2D images of 3D objects. In accordance with this embodiment, an OAI image, $i'(x,y)$, may be captured directly from the object (block 331), for example, by integrating x,y image data across a selected or predetermined range along the optical axis in the z direction; in that regard, relative translation of the object and the image plane may be provided during the OAI scan as set forth above. The OAI image, $i'(x,y)$, like the projected image illustrated in FIG. 2B, is expressed at Equation 8 above. In the exemplary embodiment of FIGS. 2C and 3C, however, the OAI image may be generated as the image data are obtained; the integration in this instance may be said to occur concomitantly or substantially simultaneously with the data acquisition. Accordingly, image data for a stack of discrete optical sections need not be acquired; this results in a significant reduction in data processing overhead. Efficient deconvolution performance at block 332 may be achieved in part because the OAI image is expressed in 2D rather than in 3D.

Figure 4A:
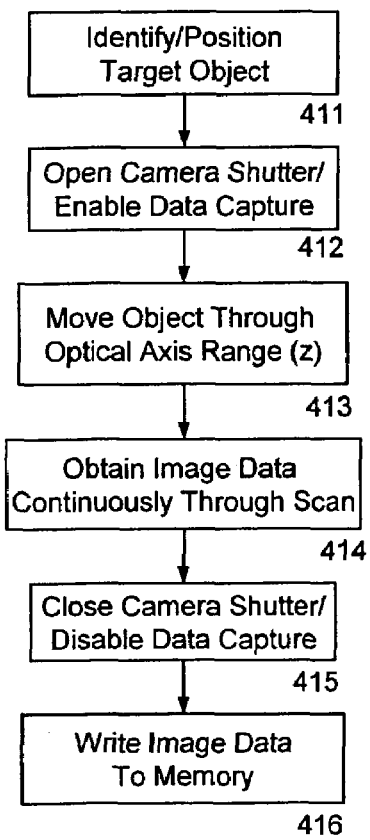
FIGS. 4A and 4B are simplified flow diagrams respectively illustrating the general operation of embodiments of analog and digital optical axis integration.
Figure 4B:
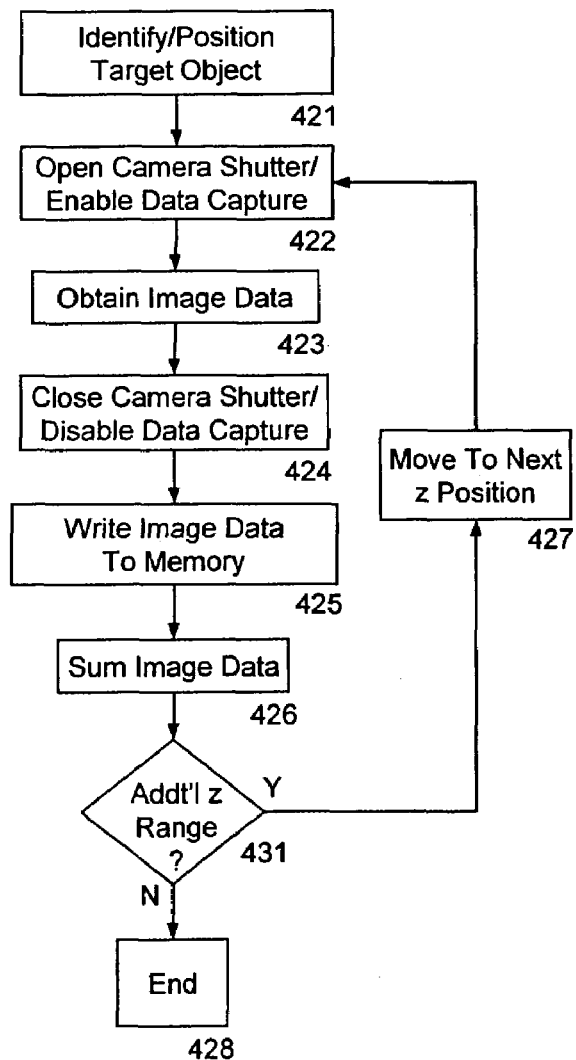

FIGS. 4A and 4B are simplified flow diagrams respectively illustrating the general operation of embodiments of analog and digital optical axis integration. It will be appreciated that the exemplary embodiments illustrated in FIGS.

4A and 4B may generally correspond to the integration operation depicted at block 331 and described above with reference to FIG. 3C; the illustrated OAI techniques may enable generation of an OAI image, i'(x,y), such as expressed at Equation 8.

In both the analog (FIG. 4A) and digital (FIG. 4B) OAI methods, a target object to be imaged may be identified and positioned (blocks 411, 421) relative to microscope optics substantially as set forth above; with respect to positioning at blocks 411 and 421, only the x and y coordinates of the object may be considered, i.e., the object may be accurately aligned with the optical path. The operations depicted at blocks 412 and 422 are intended to represent any type of initiation or enablement of data capture or data acquisition; specifically, such initiation is not intended to be limited to physical movement or manipulation of a camera shutter, for example, nor to imply other structural limitations. In that regard, the functionality represented at blocks 412 and 422 may include, inter alia, providing power to a CCD, for instance. Similarly, the operations depicted at blocks 415 and 424 are not intended to imply structural limitations, and generally encompass numerous techniques for disabling data capture functionality, for example, such as by closing a camera shutter.

In the analog embodiment of FIG. 4A, the object may be moved along the optical axis through a predetermined or specified range (i.e., distance in the z direction) as indicated at block 413. It will be appreciated that the movement represented at block 413 may generally be measured relative to microscope optics or an image plane, for example, as set forth in detail above. Specifically: the object itself may remain stationary while the optics are moved; the optics may remain stationary while the object is moved; or some combination of system components may be moved in cooperation.

As noted above, an analog method of OAI may comprise obtaining image data (block 414) continuously during the z axis scan (i.e., relative translation of the object and the image plane along the optical axis). Specifically, the OAI image may be generated by scanning the object along the optical axis while the image data are accumulated within a CCD or other detector 141. Accordingly, the integration or projection may be performed during (concomitantly or substantially simultaneously with) data acquisition, and the image data written to memory at block 416 generally may represent a single image, i'(x,y), such as depicted in the center of FIG. 2C. The method of FIG. 4A, therefore, may result in or facilitate generation of a single 2D image representing the entire depth of the object in the z direction. As noted above, the method of FIG. 4A may generally correspond to the operation depicted at block 331.

In contrast to the analog method, the digital OAI embodiment of FIG. 4B may obtain image data (block 423) in discrete steps. As illustrated by the iterative loop containing blocks 422–424, acquired image data generally represent a plurality of 2D (x,y) sections; image data representing discrete optical sections are written to memory (block 425) and summed or otherwise manipulated (block 426) as acquired at each z position. In particular, the integration or projection may occur as image data for each optical section are captured, i.e., concomitantly with the data acquisition. Accordingly, generation of a 3D image, i(x,y,z), such as illustrated at the left side of FIGS. 2A and 2B, for example, may not be necessary.

In accordance with a determination made at decision block 431, the method may progress to the next optical section in sequence, moving the object, the microscope optics, or both, so as to position the focal plane at the next sequential position along the z axis of the object; this event is represented at block 427. Following a progression through a desired, selected, or predetermined range in the z direction (as determined at decision block 431), the method may end (block 428), resulting in or allowing generation of a single, two-dimensional OAI image, i'(x,y), representing the entire depth of the object in the z direction. As noted above, the method of FIG. 4B may generally correspond to the operation depicted at block 331.

Figure 5:
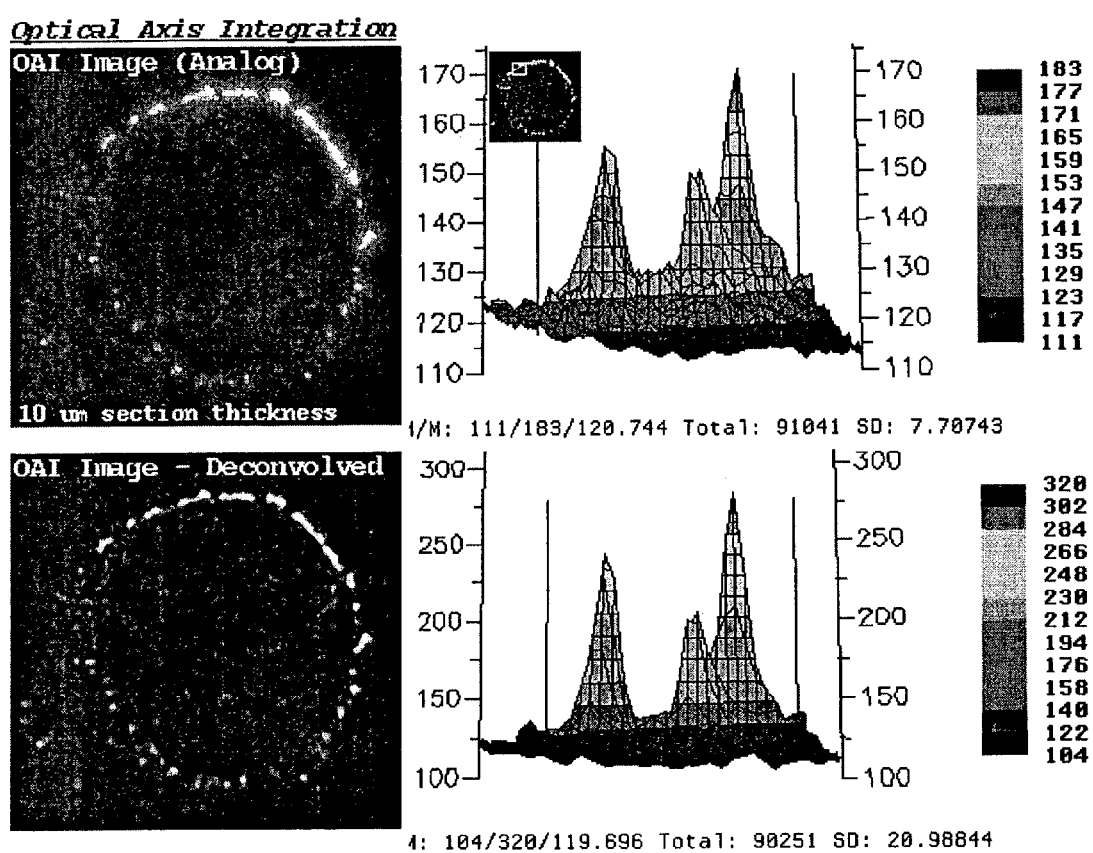
FIG. 5 is an illustration of results of an optical axis integration method.

FIG. 5 is an illustration of results of an optical axis integration method. It will be appreciated that the OAI images illustrated in FIG. 5 may be enabled by the procedures set forth and described above with reference to FIGS. 4A and 4B.

Time-Delay Integration

As used herein, the phrase "time-delay integration" (TDI) generally represents a method of continuous scanning which may be implemented in conjunction with CCD cameras or other imaging devices. In CCD cameras, for example, incident light is creates electric charge at individual charge-coupled wells on the device surface. Charged electrons are then transferred sequentially down the columns of the chip (parallel shifts) while the row that reaches the bottom of the chip is transferred to an accumulator called the serial register. The serial register is then shifted horizontally and processed by an A/D converter.

In accordance with some TDI embodiments, precision motion control may be employed to synchronize motion of the object being imaged or motion of the camera or other imaging device (as set forth above with reference to FIG. 1A) with motion of the charged electrons across the CCD or imaging device surface. Relative translation of the object and the image plane along the lateral axis may be controlled such that a particular portion of the imaged object tracks down the chip as the electrons representing that particular portion of the image are shifted down the chip. As set forth in detail above, such relative translation may comprise motion of the object, motion of the image plane, or both. Accordingly, the object may be continuously imaged as it passes down the chip. TDI methodologies may facilitate or enable efficient scanning of fluorescent DNA microarrays, for example, and may have utility in various other applications related to scanning myriad biological specimens.

Figure 6:
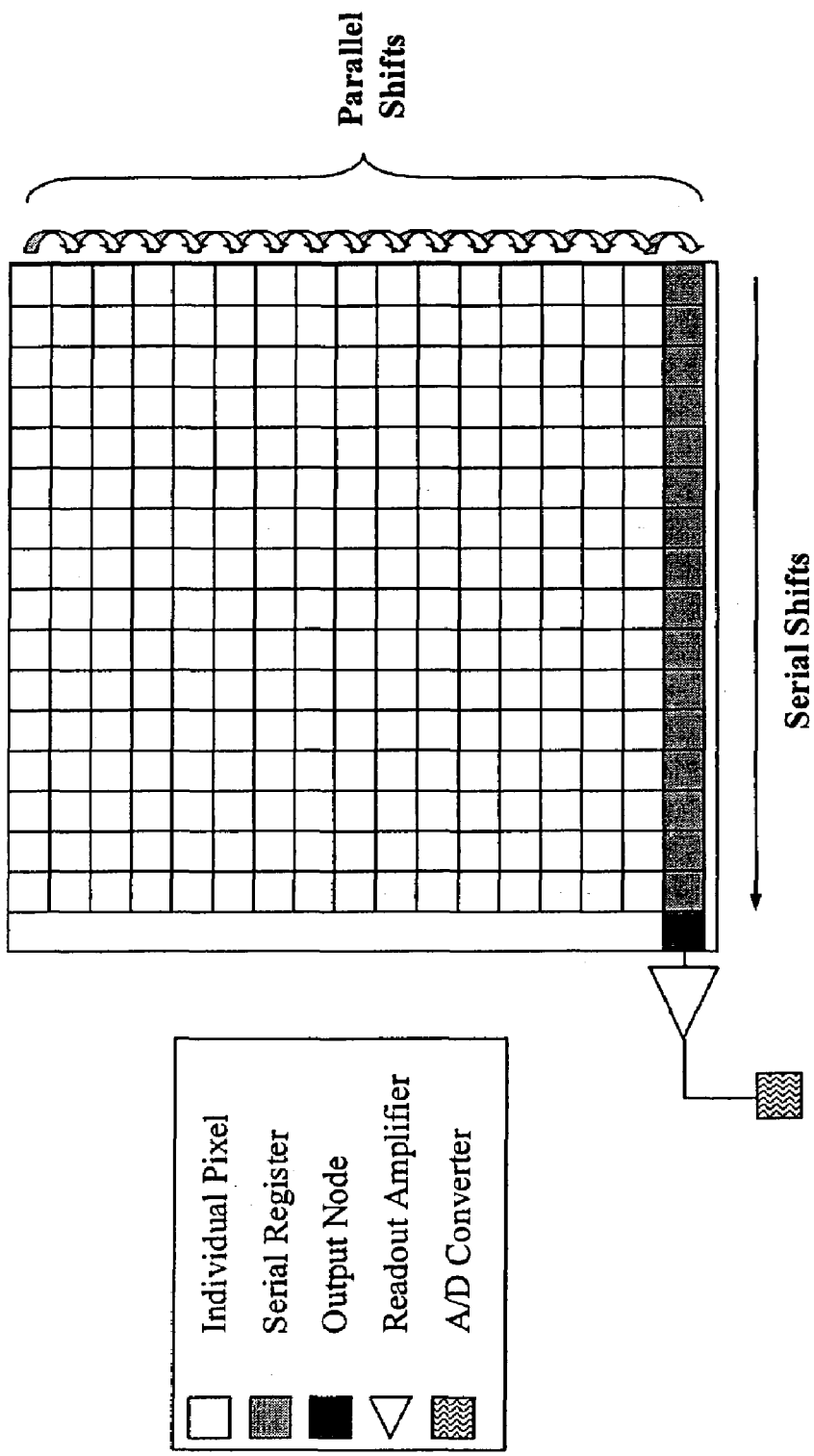
FIG. 6 is a simplified diagram illustrating the general operation of shifts and readout functionality for a full frame CCD camera.

FIG. 6 is a simplified diagram illustrating the general operation of shifts and readout functionality for a full frame CCD camera. In that regard, FIG. 6 provides a simple demonstration of slow-scan CCD camera read operations. Individual pixel electrons are shifted in parallel (e.g., down the columns to successive rows) to a predetermined portion of the chip (e.g., the bottom of the chip in FIG. 6). Image data at the bottom row are shifted off of the chip onto the serial register, which is, in turn, shifted horizontally to the readout amplifier to create a voltage that is digitized to form a digital image.

It will be appreciated that the FIG. 6 embodiment is provided for illustrative purposes only, and that various CCD cameras or other imaging devices may be characterized by alternative operational features, particularly with respect to the exemplary geometry. For example, the operation of some CCD cameras may execute parallel shifts oriented at 90 or 180 degrees from those depicted in FIG. 6.

Figure 7:
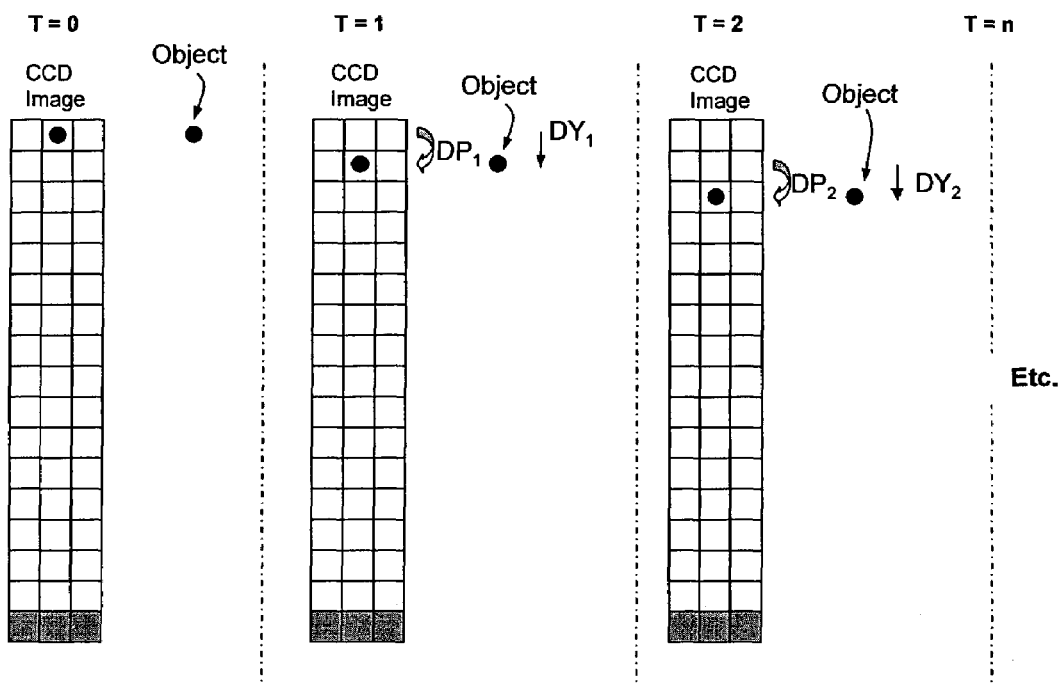
FIG. 7 is a simplified diagram illustrating one embodiment of time-delay integration synchronized with parallel shifts.

FIG. 7 is a simplified diagram illustrating one embodiment of time-delay integration synchronized with parallel shifts. In that regard, FIG. 7 illustrates a precise motion control TDI implementation which may be employed in fluorescence imaging systems, for example, or in numerous other imaging applications. In accordance with the exemplary embodiments, a given location on the specimen ("object" in FIG. 7) may move (either relative to the CCD chip, for example, or relative to the image plane of the system) in synchrony with the parallel shifts such that VP (i.e., the parallel shift velocity) is equal to VY (i.e., the image shift velocity). In the foregoing manner, the specimen may be imaged throughout the period of time that it takes for an entire chip to be read by the camera.

In this context, synchronous motion between the object and the CCD row may be effectuated substantially as set forth in detail above with reference to FIG. 1A. Relative motion of slide 190, stage 120, various optical components, or some combination thereof, for instance, may accurately position the object depicted in FIG. 7 in a suitable location for imaging during the scan. The degree of synchronicity, the velocities imparted to the mechanical components, the precision with which the object must be positioned for a desired imaging quality, mechanical settling time, backlash, and the like may vary in accordance with system configuration, and may be application dependent.

Upon examination of FIGS. 6 and 7, it will be readily apparent that relative translation of the object and the image plane along the lateral axis as set forth above may be synchronized with the rate at which data are acquired and read from the detector. Accordingly, it is noted that the capabilities of the CCD camera or other imaging device (such as detector 141) and other components of the optical system (such as, inter alia: the maximum resolution and the time required to focus the imaging device; and NA and DOF of the optics) may affect the behavior and performance of the system employing the FIG. 7 TDI embodiment.

FIGS. 8A and 8B illustrate representations of images acquired using one embodiment of time-delay integration. In the TDI system used to generate the exemplary images, the period of time for reading the entire CCD chip is approximately 0.4 seconds.

FIG. 8A is a representation of an image of a dirty blank slide scanned using a TDI technique. Vertical bands indicate the locations of individual TDI "strips," or portions of the imaged area. Following completion of a particular TDI strip, the sample, the imaging device, or both, may then be moved horizontally and a new TDI strip may then be acquired. Multiple strips may then be assembled to create the final image. FIG. 8B depicts a comparison of a region of a fluorescent microarray sample imaged first with individual panels and then with one embodiment of a TDI method. It is noted that the individual panel borders are visible both horizontally and vertically in the "standard scan" image on the left side of FIG. 8B, while only the vertical bands are visible in the TDI scan on the right. Both of these images were acquired without calibrating the illumination and collection efficiencies across the field (i.e., flat-field calibration).

Various embodiments of TDI may be employed to image objects in applications involving limited or minimal signal intensity. Specifically, the motion control characteristics of TDI allow for longer exposure per picture element (pixel) for a given total image collection time, facilitating increased imaging quality even in instances where signal intensity ordinarily would be a deleterious factor. In many biological sample imaging applications, for example, signal intensity may be limited or otherwise impeded either by the nature of the sample, by the illumination intensity, by the physical characteristics or operational parameters of the indicators used in conjunction with the sample, or by some combination of the foregoing.

By way of example, one application in which the above-mentioned factors are especially problematic is in the imaging of fluorescently labeled biological specimens. In imaging applications involving such samples, all three limitations noted above (ie., related to the sample, the illumination source, and the indicator employed) are prevalent. Accordingly, TDI methodologies may be used in conjunction with known fluorescence imaging technology to minimize the attendant effects of weak signal intensities.

While it will be appreciated that TDI techniques may prove useful in the context of multiple panel collection imaging schemes producing images such as those illustrated in FIGS. 8A and 8B, some TDI systems and methods may employ a single, wide detector; in that regard, a broad detection apparatus may be used to collect a single "strip" that represents the final image. Specifically, where detector 141, a CCD camera, or other imaging apparatus accommodates a sufficiently broad imaging surface, for example, the multiple strips illustrated in FIGS. 8A and 8B may be acquired in a single scan.

As mentioned above, one of the difficulties associated with scanning biological specimens, especially for fluorescence characteristics, is generally due to the fact that a finite limit exists with respect to the intensity of light emanating from an illuminated sample. In accordance with the present disclosure, however, adjusting the scan rate (i.e., the relative movement of the sample across the CCD imaging surface) and the readout speed of the imaging device enables a system and method of TDI imaging to control the exposure time for each pixel in the acquired image.

Additionally, it will be appreciated that many samples (in biological fields and in other scientific areas) are labeled with multiple indicators, each of which may be spectrally separated the others. Consequently, some TDI embodiments may incorporate an ability to address multiple wavelength data. By way of example, data spanning multiple wavelengths may be acquired in at least two different ways: sequential scanning; and simultaneous scanning.

In TDI implementations incorporating sequential scanning techniques, a single, monochromatic detector may be employed; in this embodiment, multiple wavelengths may be selected through filters, for instance, or through other wavelength selection components or methods. To construct a single, multiple wavelength image, an instrument or system operative in accordance with the present disclosure may scan the sample (or a strip of the sample) through a selected or predetermined filter to acquire image data at a desired wavelength, change the filter (using a filter wheel, for example, or similar apparatus), and scan the same sample (or strip of sample) through the new filter to acquire additional image data at a different desired wavelength. The foregoing operations may be selectively repeated in accordance with system requirements to acquire a plurality of scan images at a desired number of selected wavelengths. In this manner, a final image may be constructed of the data acquired during the plurality of sequential scans.

It will be appreciated that one of the challenges associated with such a methodology is the registration of scans, particularly in instances where the exposure time used for one wavelength differs from the exposure time used for another. In such situations, a TDI system and method may measure and control the actual velocities and positions of the sample during each of the plurality of scans; precise control of scan speeds, and accurate measurements thereof, may prevent or allow for correction of chromatic shift in the portions of the image that are derived from the component scans. Accordingly, systems and methods of TDI as described herein may selectively synchronize the movements as set forth above responsive to such different conditions.

Figure 9:
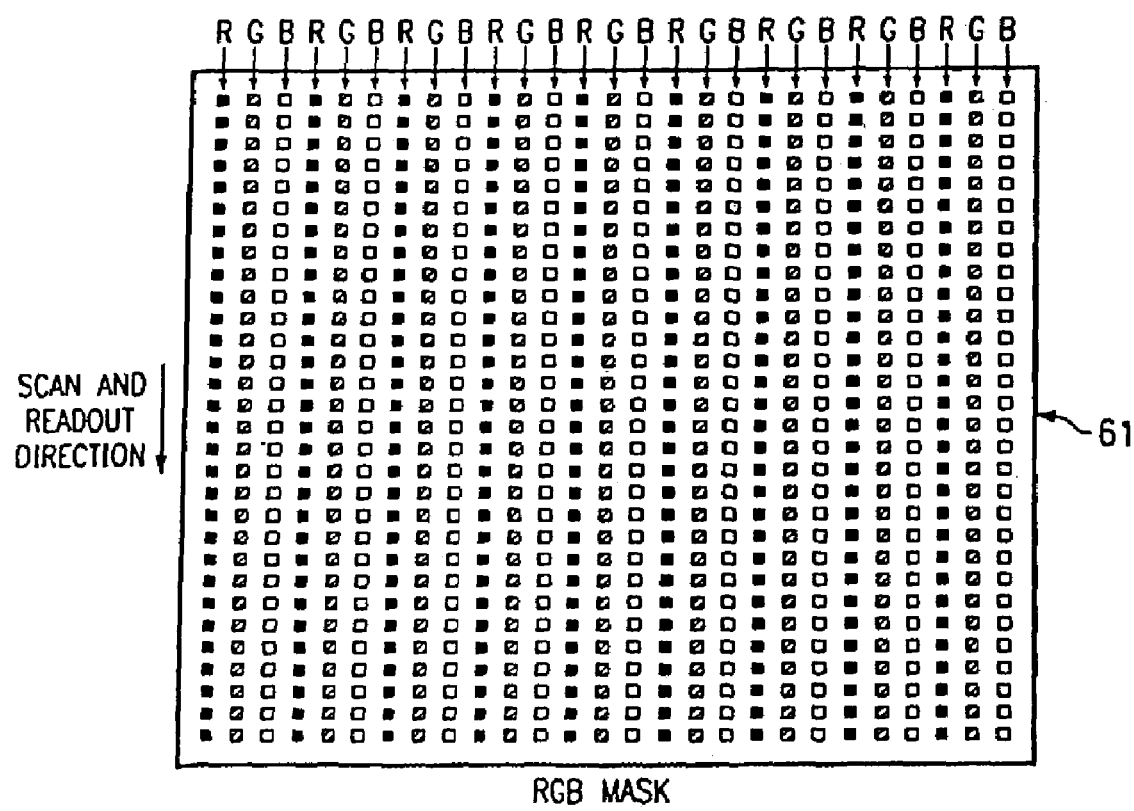
FIG. 9 is a simplified illustration of one embodiment of a CCD detector mask enabling acquisition of multi-spectral image data.

In some embodiments, multi-spectral image data may be acquired from a single sample using multiple detectors, for example, each with its own spectral response. In this manner, a multiple wavelength image may be collected in a single scan. Alternatively, such a multi-spectral scan may be accomplished with a single detector or imaging device equipped with a specially designed color mask. In that regard, FIG. 9 is a simplified illustration of one embodiment of a CCD detector mask enabling acquisition of multi-spectral image data. The mask may be arranged in alternating columns of red (R), green (G), and blue (B), for example, as depicted in FIG. 9. Each of these respective columns in the mask may facilitate the respective acquisition of red, green, and blue spectral image data. While the exemplary embodiment illustrates columns, it will be appreciated that the alternating pattern may be oriented in such a way as to be parallel to the scan direction of the imaging device, i.e., where the scan occurs in rows, or 90 degrees from the scan direction illustrated in FIG. 7, the mask may be arranged to accommodate the operational characteristics of the imaging device. As opposed to the sequential scan described above, a single, multi-wavelength, simultaneous scan may be implemented in conjunction with a mask such as illustrated in FIG. 9.

It is noted that positioning methodologies in various TDI embodiments may employ constant relative velocity of the object to be imaged and the imaging surface of the imaging device. As set forth above, constant relative positioning of the object to be imaged may be accomplished through precise motion of the slide, the stage, the optics, or some combination thereof. In addition, it is possible to implement TDI methods employing one or more incremental positioning strategies; in that regard, relative motion of the object to be imaged may be synchronized to the readout (or output) capabilities of the CCD camera or other imaging device. In this manner, long exposures may be accommodated.

In such embodiments, the velocity of the object may become so slow as to become non-constant, depending upon the output bandwidth and readout rate of the imaging device. In some circumstances, for example, the sample or object may be translated (relatively) a distance corresponding to one camera row, maintained at that location for the duration of an exposure, and subsequently translated a distance corresponding to the next camera row. The foregoing procedures may be selectively repeated in accordance with system requirements or as desired. As set forth above, relative movement of the object, the slide, the stage, the optics, or some combination thereof, may begin and cease at each row shift in the camera or imaging device. The high degree of synchronization provided by such an approach may yield excellent resolution and registration between wavelengths.

Rotational and positional errors in precision motion stage systems may be measured and corrected, for example, using optically determined coordinate calibration or other methods. In particular, such errors may be minimized dynamically through precise modification of stage movements. Specifically, such coordinate calibration may also be used in conjunction with. TDI techniques dynamically to correct rotational and positioning errors during a given TDI scan.

Multi-Axis Integration

As noted generally above, a system and method employing multi-axis integration (MAI) may incorporate both OAI and TDI techniques.

In that regard, TDI is described in co-pending U.S. nonprovisional application Ser. No. 10/215,265, filed Aug. 6, 2002, entitled "TIME-DELAY INTEGRATION IMAGING OF BIOLOGICAL SPECIMENS." Specifically, TDI methodologies as set forth in detail above enable a system and method of image data processing simultaneously to collect image data over a given lateral area and to read data out of the camera or detector. That is, data are acquired and read from the detector simultaneously. Accordingly, a system implementing TDI methods may efficiently acquire image data over a large area (relative to the focal plane of the detector) with substantially reduced overhead as compared to systems which do not implement TDI.

U.S. provisional application Ser. No. 60/431,692, filed Dec. 6, 2002, entitled "OPTICAL AXIS INTEGRATION SYSTEM AND METHOD" describes various methodologies for collecting image data as an integration (along the optical axis) of intensity information for a given x-y image frame. As set forth in detail above with reference to FIG. 4A, for example, some analog OAI techniques utilize relative translation (along the optical axis) between the optical train and the specimen during integration to achieve an analog summing of the intensities over the depth of the z translation.

While the OAI methodologies set forth above are powerful, the disclosed embodiments may be augmented with one or more TDI scanning techniques. As set forth above with reference to FIGS. 4A and 4B, an OAI image may be generated through integration of data acquired during a z translation (i.e., parallel with the optical axis as illustrated in FIG.1B); image data may be read from the CCD camera or other detector 141 before another integration begins. Depending upon various operational characteristics of detector 141 and the capabilities of the associated electronics in processor 142, the readout may require up to one second, during which time many aspects of the scan must stop. This inefficiency due to downtime may be avoided if the z translation is coordinated with the lateral translation (i.e., motion in the x and y directions, orthogonal to the optical axis) attendant with the TDI scan as noted above. That is, data gathered by detector 141 may be read continuously during the z translation (resulting in an integration of intensities along z) and simultaneously with lateral movement (such as along the y axis) which presents new areas of the sample to detector 141; in some embodiments synchronizing such lateral movement with the readout capabilities of the CCD camera or other imaging device (i.e., detector 141), additional computational efficiency may be achieved. During such an MAI scan, the camera or detector 141 generally operates to acquire image data in cooperation with continuous and simultaneous z- and y-motion.

In that regard, a system and method incorporating MAI techniques may generally acquire a plurality of OAI images, each of which may include data captured from a different lateral location in x-y space on slide 190 or stage 120. The lateral scan may employ a raster or serpentine pattern, for example; in some embodiments, a serpentine lateral scan pattern may enable an MAI system and method to operate at optimum efficiency.

Various data collection parameters may be optimized to maintain quantitative accuracy in accordance with system requirements. In particular, z-axis motion may be suitably controlled to assure an appropriate scan profile; accordingly, the resulting OAI image may not be biased with information from any particular z location in the sample or the object to be imaged. Additionally, the period of the scan profile may be computed as a multiple of the time required to read a whole frame of data from detector 141 as set forth above in detail with reference to FIGS. 6 and 7.

Figure 10:
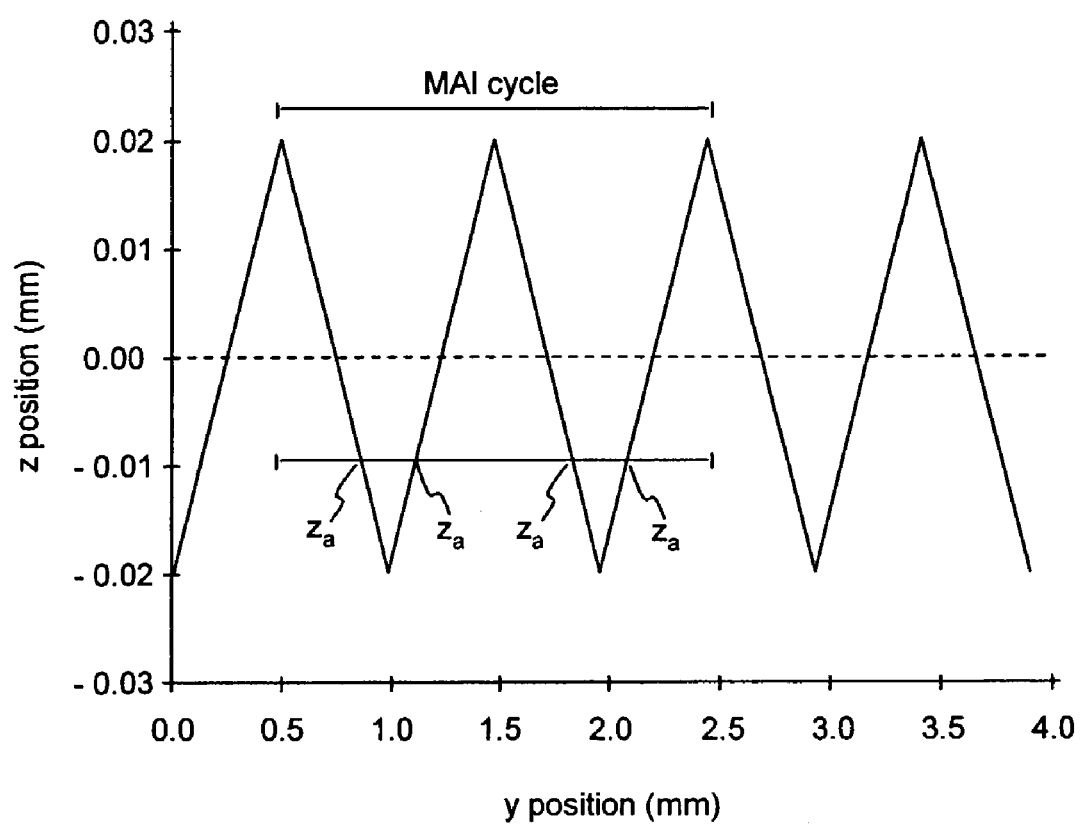
FIG. 10 is a simplified plot illustrating one embodiment of a multi-axis integration scan cycle.

FIG. 10 is a simplified plot illustrating one embodiment of a multi-axis integration scan cycle. As indicated in FIG. 10, the z position of the image plane along the optical axis is represented on the ordinate axis, and the y position of the optical axis relative to the stage 120 or slide 190 upon which the object to be imaged is disposed is represented on the abscissa. It will be appreciated that similar results may be obtained by providing lateral movement along the x axis, either in addition to, or as an alternative to, motion along the y axis. As set forth in detail above with reference to FIG. 1A, accurate positioning of the focal plane relative to slide 190 and the area to be imaged may be effectuated by relative movement of various components (such as slide 190, stage 120, and objective 119, for example), either individually or in combination.

Various MAI techniques may incorporate either continuous (analog) or incremental (digital) scanning methodologies, as set forth below.

Analog MAI:

In accordance with some embodiments employing an analog MAI technique, the z location of the image plane may be moved continuously along the optical axis between a minimum and maximum position (i.e., in and out of focus). The velocity of this z translation may be determined or calculated as a function of the required scan distance (i.e., the distance between the minimum and maximum z locations of the image plane), as well as a desired scan time period. Acceleration may be made as large as possible such that, for example, the position-versus-time curve of the image plane may have a triangular wave pattern. A system operating in accordance with the analog MAI scan pattern illustrated in FIG. 10, for example, may facilitate uniform exposure at each z location within the scan.

During translation of the image plane through the z scan, the y axis may be simultaneously scanned at constant velocity such that the image traverses the entire detection surface of detector 141 while the z translation completes a cycle. Accordingly, each row of detector 141 may be exposed to each z position four times as indicated by the points marked $z_a$ in FIG. 10, i.e., every z position may be scanned four times during a single MAI cycle. In such an embodiment, the exact starting location or position (in the z dimension) of the object to be imaged may be irrelevant with respect to the quality and the efficiency of the scan, since the object will cross each z position four times during a particular MAI cycle. It will be appreciated that for any given lateral translation, higher z scan frequencies (i.e., greater than four per MAI cycle) are also possible.

Digital MAI:

In accordance with digital MAI methodologies, the y and z axis translations may be executed incrementally while rows of image data are read from the detector.

By way of example and not by way of limitation, the number of increments, $n_z$, along the z axis in some embodiments of a digital MAI cycle may be expressed as $$n_z = 3n_y - 1$$

where $n_y$ represents the number of lateral MAI increments in a single MAI cycle. In the case of a CCD detector, for example, $n_y$ may simply represent the number of binned CCD rows:

$$n_y = \text{number\_binned\_CCD\_rows}$$

In some implementations, the scan may also be constrained by the following equation for $n_z$:

$$n_z = (\text{total scan range along z})/(\text{row height})$$

When a CCD chip is being used as detector 141, the row height is the binned CCD row height.

It will be appreciated that integral multiples of $n_z$ may also be used for certain scanning techniques. Further, it will also be appreciated that various of the foregoing equations are susceptible of modification in accordance with system requirements, for example, or in accordance with individual limitations of system components. For example, operational characteristics of one or more stepper motors or servos implemented in stage or optics component motion control may dictate the values for $n_z$ or $n_y$ in some instances. Additionally or alternatively, some circumstances may require or benefit from dynamic computation or adjustment of $n_z$ and $n_y$; one such circumstance may include, for example, acquisition of image data at a plurality of wavelengths during multi-spectral scans.

In that regard, motion control of various system components may be provided or accommodated by electronics 150 as set forth above with reference to FIG. 1. Dynamic configuration of MAI scan motion parameters may be readily implemented by one or more microprocessors or microcontrollers associated with, incorporated into, or operably coupled to electronics 150.

FIG. 11 is a simplified side view of an object to be imaged, and FIGS. 12A–12C are simplified side view illustrations of an image plane traversing an object to be imaged using one digital multi-axis integration method. The z and y directions are indicated by the coordinate axes in FIG. 11. For illustrative purposes, the 3D object to be imaged is represented by the 2D grid and designated by rows 1–4 in the z dimension and columns a–d in the y dimension; it will be appreciated that the object to be imaged may extend in the x direction, i.e., normal to the plane of FIG. 11, as well. A smaller representation of the FIG. 11 object is reproduced in FIGS. 12A–12C; additionally, though the shapes are slightly different, it will nevertheless be understood that the object depicted in FIGS. 11 and 12A–12C may represent object 199 illustrated in FIG. 1B.

Turning now to the sequence illustrated in FIGS. 12A–12C, a side view of the image plane is represented by the darkened grid squares, and the arrows indicate the direction of image plane motion relative to the object to be imaged; as with the object depicted in the figures, it will be appreciated that the image plane generally extends in the x direction, i.e., normal to the plane of FIGS. 12A–12C. It is also noted that the arrows depicted in the drawing figures are not vectors; in that regard, the arrows are only intended to indicate the direction of relative motion for the image plane from one scan position to the next, and are not intended to convey information regarding the velocity of such motion.

The shading in the representation of the object to be imaged is provided to indicate the number of times a particular location of the object has been imaged by the image plane. The partially exploded view (i.e., the separation between the object and the image plane) is provided for clarity.

For example, when at scan position 1 in FIG. 12A, only the right portion of the image plane in the figure may be acquiring image data; only portion a1 of the object is within the image plane, and the arrows indicate the motion of the image plane at this point in the scan sequence. When at scan position 2 in FIG. 12A, the image plane has traversed in the y direction as indicated (i.e., to the right) relative to its location at scan position 1; in conjunction with the indicated z translation, the image plane at scan position 2 may be acquiring data at portions a2 and b2 of the object. The locations (on the object) of data acquired at earlier or previous scanning positions in the sequence are indicated above the image plane in FIGS. 12A–12C. In accordance with the TDI embodiments set forth above, these data depicted above the image plane may have been read from the imaging device (such as detector 141 in FIG. 1A, for example) during the synchronous z and y motion.

It will be appreciated that at scan position 4, for example, and at other points during the scan sequence, the image plane may reverse direction; accordingly, z translation may be omitted at this point in the sequence. As indicated in FIG. 12A, the image plane may remain at the same z location for scanning operations which occur at scan positions 4 and 5. While the image data acquired at position 5 will be at the same z location as those acquired at scan position 4, the image plane has continued traversing in the y direction relative to its y location at scan position 4.

In the exemplary digital MAI scan of FIGS. 12A–12C, each z position is traversed by the image plane three times during the scan sequence; in conjunction with relative motion in the y direction, the image plane may acquire image data from each location a1–d4 on the object twice. For example: image data are acquired for location a1 when the image plane is at scan positions 1 and 8; similarly, image data are acquired for location a2 when the image plane is at scan positions 2 and 7; and so forth.

In the foregoing embodiment, the equation $n_z=3n_y-1$ may be satisfied where the number of z increments in the scan sequence equals eleven ($n_z=11$); that is, the twelve sequential scan positions represent eleven incremental movements in the z direction, starting from scan position 1.

As noted briefly above, integral multiples of $n_z$ may be employed in certain embodiments effectively to increase the z scan frequency. Alternative computations may also be used to calculate $n_z$ as a function of $n_y$, additional factors, or some combination thereof in some embodiments. As with the analog MAI scan embodiments described above, digital MAI scans techniques may employ a variety of alternative z scan frequencies depending upon system requirements, component capabilities, multi-wavelength scan strategies, and so forth. Motion parameters such as lateral velocity and z scan frequency may be dynamically adjusted or selectively altered, for example, by control electronics 150 or similar programmable electronic components. In some embodiments, for example, electronics 150 may selectively adjust motion control parameters in accordance with feedback, data, or other instructions transmitted by image processor 142.

Upon examination of FIGS. 12A–12C, it will be apparent that image plane dimensions, particularly when considered relative to the size of the object to be imaged, may affect the total amount of data acquired during an MAI scan, in general, and when the image plane is at specific scan positions, in particular. In that regard, if the image plane depicted in FIGS. 12A–12C were larger in the y dimension than that shown, image data for additional object locations may be acquired, for instance, when the image plane is at scan positions 1–3 and 9–12.

FIG. 13 is an MAI summary. The FIG. 13 summary represents the image data acquired during the digital MAI scan described above with reference to FIGS. 12A–12C. One or more data processing hardware or software components, for example, integrated with image processor 142 or associated with electronics 150 depicted in FIG. 1A may organize or otherwise manipulate image data acquired during the MAI scan.

Aspects of the present invention have been illustrated and described in detail with reference to particular embodiments by way of example only, and not by way of limitation. Those of skill in the art will appreciate that various modifications to the exemplary embodiments are within the scope and contemplation of the present disclosure. It is intended, therefore, that the present invention be limited only by the scope of the appended claims.

The invention claimed is:

1. A method of acquiring data; said method comprising:
   scanning an object along an optical axis;
   simultaneously scanning said object along a lateral axis;
   acquiring image data of said object during said scanning and said simultaneously scanning; and
   integrating said image data concomitantly with said acquiring.

2. The method of claim 1 wherein said scanning comprises providing relative translation along said optical axis of said object and an image plane.

3. The method of claim 1 wherein said simultaneously scanning comprises providing relative translation along said lateral axis of said object and an image plane.

4. The method of claim 1 wherein said acquiring comprises utilizing a charge-coupled device.

5. The method of claim 1 wherein said integrating comprises utilizing an image processor.

6. The method of claim 1 further comprising deblurring said image data subsequent to said integrating.

7. The method of claim 1 further comprising deconvolving said image data subsequent to said integrating.

8. The method of claim 7 further comprising calculating a two-dimensional projection of said object from a projection of said image data and a projection of an optical point-spread-function.

9. The method of claim 2 wherein said scanning further comprises selectively alternating a direction of said relative translation along said optical axis.

10. The method of claim 3 wherein said simultaneously scanning comprises synchronizing said relative translation along said lateral axis with a rate associated with said acquiring.

11. A method of acquiring image data of an object; said method comprising:
    performing an optical axis integration scan;
    simultaneously executing a time-delay integration scan sequence; and
    selectively repeating said performing and said executing.

12. The method of claim 11 wherein said performing comprises acquiring image data of said object at an image plane positioned along an optical axis.

13. The method of claim 12 wherein said performing further comprises providing relative translation along said optical axis of said object and said image plane.

14. The method of claim 13 wherein said executing comprises providing relative translation along a lateral axis of said object and said image plane.

15. The method of claim 13 wherein said performing further comprises selectively alternating a direction of said relative translation along said optical axis.

16. The method of claim 14 wherein said executing comprises synchronizing said relative translation along said lateral axis with a data acquisition rate associated with an imaging device.

17. The method of claim 12 wherein said acquiring comprises utilizing a charge-coupled device.

18. The method of claim 12 wherein said performing further comprises integrating said image data concomitantly with said acquiring.

19. The method of claim 18 wherein said integrating comprises utilizing an image processor.

20. The method of claim 18 further comprising deblurring said image data subsequent to said integrating.

21. The method of claim 18 further comprising deconvolving said image data subsequent to said integrating.

22. The method of claim 21 further comprising calculating a two-dimensional projection of said object from a projection of said image data and a projection of an optical point-spread-function.

* * * * *